United States Patent
Lu et al.

(10) Patent No.: US 9,128,533 B2
(45) Date of Patent: Sep. 8, 2015

(54) KEYBOARD CIRCUIT AND METHOD FOR KEYBOARD CIRCUIT

(75) Inventors: Fan-Lin Lu, Shenzhen (CN); Xin Zhao, Shenzhen (CN); Ruey-Shyang You, New Taipei (TW); Xiao-Guang Li, Shenzhen (CN); Han-Che Wang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 818 days.

(21) Appl. No.: 13/095,885

(22) Filed: Apr. 28, 2011

(65) Prior Publication Data

US 2012/0162079 A1 Jun. 28, 2012

(30) Foreign Application Priority Data

Dec. 25, 2010 (CN) .......................... 2010 1 0605383

(51) Int. Cl.
G06F 3/02 (2006.01)
G06F 3/023 (2006.01)
G06F 1/32 (2006.01)

(52) U.S. Cl.
CPC .............. *G06F 3/023* (2013.01); *G06F 1/3271* (2013.01); *Y02B 60/1257* (2013.01)

(58) Field of Classification Search
CPC ......... G06F 3/02; G06F 3/023; G06F 3/0238; G06F 1/3271; Y02B 60/1257
USPC .............................. 345/156, 168, 169; 341/22
See application file for complete search history.

(56) References Cited

U.S. PATENT DOCUMENTS

| | | | | |
|---|---|---|---|---|
| 5,865,546 A | * | 2/1999 | Ganthier et al. | 400/489 |
| 6,256,682 B1 | * | 7/2001 | Gudan et al. | 710/14 |
| 6,393,509 B2 | * | 5/2002 | Yamada et al. | 710/300 |
| 6,727,952 B1 | * | 4/2004 | Hirata et al. | 348/372 |
| 2003/0052164 A1 | * | 3/2003 | Higginson | 235/380 |
| 2003/0065858 A1 | * | 4/2003 | Lin et al. | 710/303 |
| 2003/0146902 A1 | * | 8/2003 | Sandbach et al. | 345/168 |
| 2003/0200359 A1 | * | 10/2003 | Fernald | 710/5 |
| 2006/0047982 A1 | * | 3/2006 | Lo et al. | 713/300 |
| 2008/0167828 A1 | * | 7/2008 | Terlizzi et al. | 702/64 |
| 2010/0174926 A1 | * | 7/2010 | Huang et al. | 713/300 |
| 2010/0281187 A1 | * | 11/2010 | Kim et al. | 710/15 |
| 2011/0276734 A1 | * | 11/2011 | Helfrich | 710/105 |

FOREIGN PATENT DOCUMENTS

CN 1425968 A 6/2003

\* cited by examiner

*Primary Examiner* — Rodney Amadiz
(74) *Attorney, Agent, or Firm* — Novak Druce Connolly Bove + Quigg LLP

(57) ABSTRACT

A keyboard and a keyboard circuit, wherein the keyboard acts as an input device for a portable device or a computer. The keyboard circuit comprises an interface for connecting with the computer or the portable device, a detection circuit for detecting the logic level signal of the power supply from the computer or the portable device connected to the keyboard, and a microprocessor determining whether a computer or a portable device is connected to the keyboard in accordance with the logic level signal of the power input. The keyboard circuit uses a first communication circuit to communicate with the computer and a second communication circuit to communicate with the portable device, thus the keyboard is compatible with the computer or the portable device. The keyboard is capable of entering a sleep mode after finishing the transmission of the key codes to the computer or the portable device.

16 Claims, 3 Drawing Sheets

KEYBOARD CIRCUIT AND METHOD FOR KEYBOARD CIRCUIT

BACKGROUND

1. Technical Field

The present disclosure relates to a keyboard, and particularly, to a keyboard circuit.

2. Description of Related Art

Keyboards are important input devices for computers, and as the utilities of portable devices become more and more powerful, people need to input a large amount of characters into the portable device with keyboards. However, typing with the built in keyboards of the portable devices could seriously reduce the input speed and comfort for the user, and the keyboards of the computers are not compatible with portable devices. Moreover, a traditional keyboard needs an independent power supply circuit which result in high power-consumption.

Therefore, what is needed is a power-saving keyboard and a keyboard circuit which are compatible with both the computer and the portable device.

BRIEF DESCRIPTION OF THE DRAWINGS

The components in the drawings are not necessarily drawn to scale, the emphasis instead being placed upon clearly illustrating the principles of keyboards and keyboard circuits. Moreover, in the drawings, like reference numerals designate corresponding parts throughout the several views.

DETAILED DESCRIPTION

Figure 1:
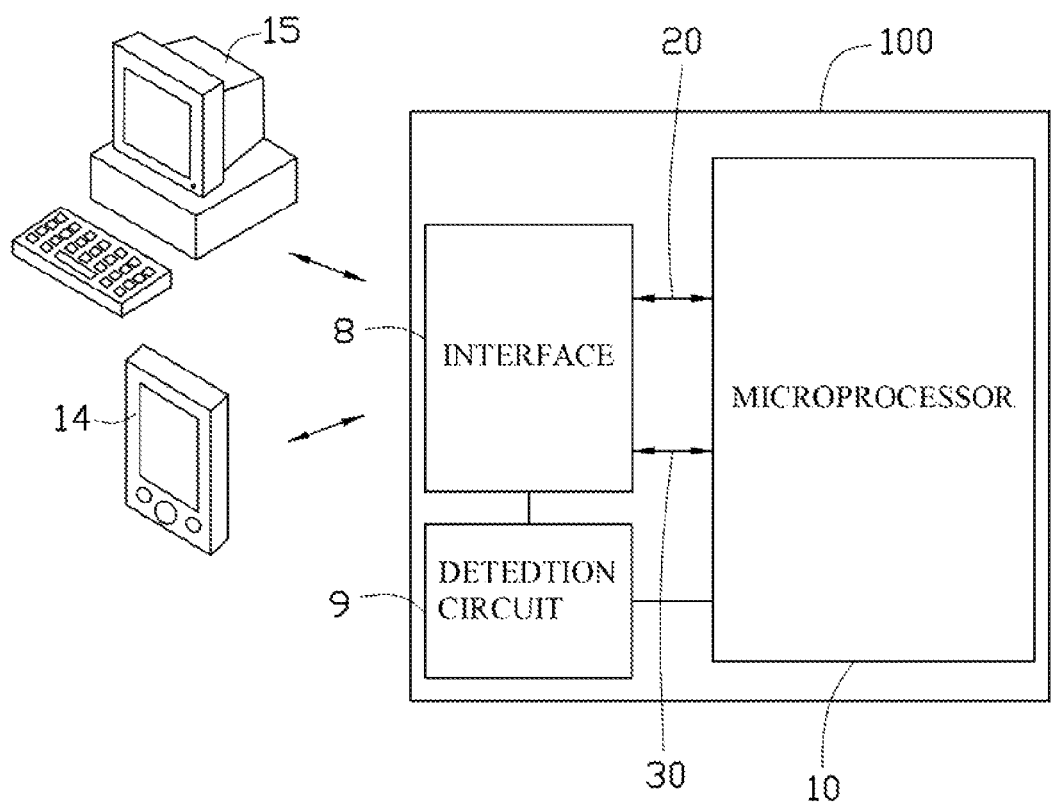
FIG. 1 is a schematic diagram of a keyboard system in accordance with an exemplary embodiment.

Referring to FIG. 1, a keyboard circuit 100 includes a detection circuit 9, a microprocessor 10, and an interface 8 for communicating with either a computer 15 or a portable device 14. When the interface 8 is connected with the computer 15 or the portable device 14, the detection circuit 9 detects the power output of the computer 15 or the portable device 14. The microprocessor 10 connected with the detection circuit 9 determines whether the interface 8 is connected with the computer 15 or the portable device 14 in accordance with the logic level signal detected by the detection circuit. The portable device 14 can be an electronic reader, a mobile phone, a personal digital assistant, or an electronic dictionary.

The keyboard circuit 100 includes a first communication circuit 20 and a second communication circuit 30 connected between the microprocessor 10 and the interface 8. The microprocessor 10 initiates the first communication circuit 20 when the interface 8 is connected with the computer 15, and initiates the second communication circuit 30 when connected with the portable device 14. The interface 8 can be a USB interface in the present embodiment.

Figure 2:
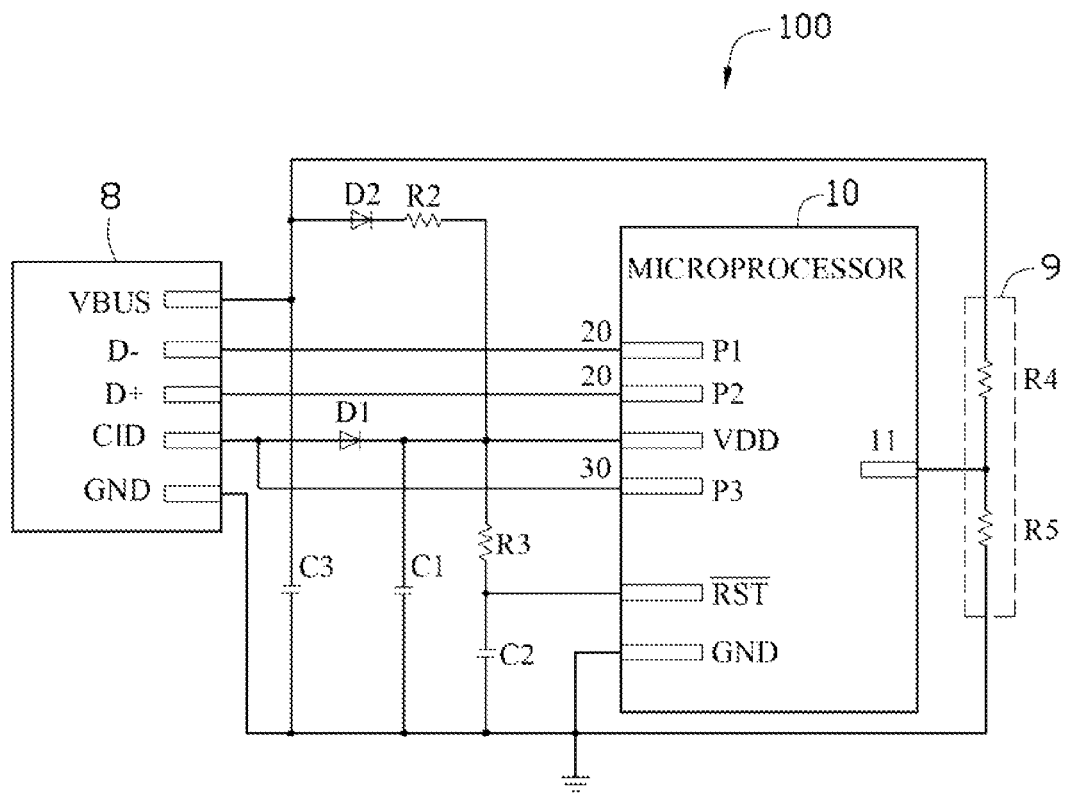
FIG. 2 is a schematic, circuit diagram of the keyboard system of FIG. 1, showing connections between a first data interface and a second data interface.

Referring to FIG. 2, the interface 8 includes a D− pin and a D+ pin for data transmission, wherein the D− pin and the D+ pin are connected respectively with a P1 pin and a P2 pin of the microprocessor 10 to form the first communication circuit 20. The interface 8 further includes a CID pin for unidirectional transmission, wherein the CID pin is connected with a P3 pin of the microprocessor 10 to form the second communication circuit 30.

The interface 8 further includes a VBUS pin for supplying power to a VDD pin of the microprocessor 10 through a diode D2 and a resistor R2, wherein the anode of the diode D2 is connected with the VBUS pin, and the cathode is connected with the resistor R2, and the VBUS pin is grounded through a capacitor C3. The VDD pin is grounded through a resistor R3 and the capacitor C2, wherein a RST pin is connected to a connection node between the resistor R3 and the capacitor C2.

The CID pin of the interface 8 supplies power to the VDD pin of the microprocessor 10 through a diode D1, wherein the anode of the diode D1 is connected to the CID pin, and the cathode is connected to the VDD pin. The cathode of the diode D1 is grounded through a capacitor C1.

The microprocessor 10 is capable of generating key codes corresponding to the keystrokes on the keyboard, wherein the key codes are transmitted to the computer 15 through the first communication circuit 20 or to the portable device 14 through the second communication circuit 30. When the key codes are transmitted to the portable device 14 through the second communication circuit 30, the capacitor C1 rather than the CID pin supplies power to the VDD pin of the microprocessor 10, wherein the capacitor C1 is charged by the CID pin when the second communication circuit 30 is not in use.

The detection circuit 9 includes a resistor R4 and a resistor R5 connected in series, wherein the resistor R4 and resistor R5 are connected between the VBUS pin and ground. A high logic level signal is generated between the resistor R4 and the resistor R5 when the computer 15 is connected to the interface 8. A voltage detection pin 11 of the microprocessor 10 is connected to the detection circuit 9 to detect the logic level signal. The microprocessor 10 analyzes the logic level signal transmitted from the voltage detection pin 11 to determine whether the logic level signal is a high logic level signal or a low logic level signal, wherein the high logic level indicates the connection of the computer 15 and the low logic level signal indicates the connection of the portable device 14.

Figure 3:
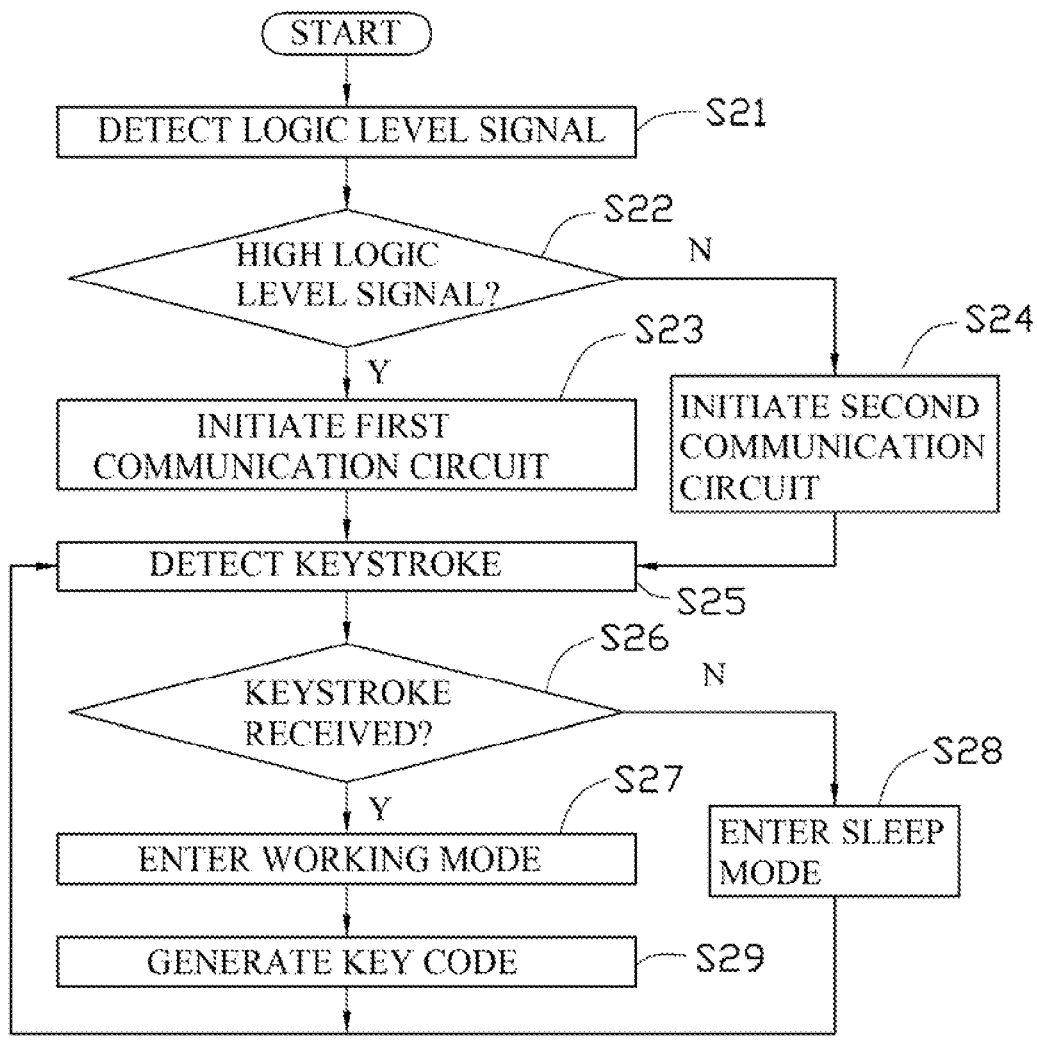
FIG. 3 is a flowchart for controlling a keyboard circuit, in accordance with an embodiment.

Referring to FIG. 3, a flowchart for controlling a keyboard circuit 100 is illustrated. In step 21, the detection circuit 9 detects the logic level signal between the resistor R4 and the resistor R5.

In step 22, the microprocessor 10 determines whether the logic level signal is a high logic level signal or a low logic level signal.

In step 23, if the logic level signal is a high logic level signal, the microprocessor 10 initiates the first communication circuit 20 to communicate with the computer 15.

In step 24, if the logic level signal is a low level signal, the microprocessor 10 initiates the second communication circuit 30 to communicate with the portable device 14.

In step 25, the microprocessor 10 detects the keystrokes on the keyboard

In step 26, the microprocessor 10 determines whether the keystrokes are received.

In step 27, if the keystrokes are received, the keyboard enters the working mode.

In step 28, if no keystroke is received, the keyboard enters the sleep mode.

In step 29, the microprocessor 10 generates the key codes corresponding to the keystrokes on the keyboard and transmits the key codes to the computer 15 or the portable device 14.

Therefore, the keyboard and the keyboard circuit 100 can be used with the computer 15 or the portable device 14 by using the first communication circuit 20 or the second communication circuit 30, and the keyboard is capable of entering the sleep mode for saving power.

What is claimed is:

1. A keyboard circuit for a keyboard, wherein the keyboard acts as an input device for a computer or a portable device, comprising:
    an interface for connecting the computer or the portable device;
    a detection circuit for detecting a logic level signal of a power supply from the computer or the portable device;
    a microprocessor connected to the detection circuit, determining whether the interface is connected with the computer or with the portable device in accordance with the logic level signal detected by the detection circuit; and
    a first communication circuit and a second communication circuit connected between the microprocessor and the interface;
    wherein the microprocessor enables the first communication circuit when the interface is connected with the computer, and enables the second communication circuit when the interface is connected with the portable device.

2. The keyboard circuit as claimed in claim 1, wherein the detection circuit comprises a first resistor and a second resistor in serial connection; the microprocessor determines whether the logic level signal between the first resistor and the second resistor is a high logic level signal or a low logic level signal; the high logic level signal indicates the interface is connected with the computer, and the low logic level signal indicates the interface is connected with the portable device.

3. The keyboard circuit as claimed in claim 1, wherein the interface comprises two data pins connected respectively with two data pins of the microprocessor to form the first communication circuit; the interface further comprises a unidirectional pin connected with a unidirectional data pin of the microprocessor to form the second communication circuit.

4. The keyboard circuit as claimed in claim 3, wherein the interface further comprises a power supply pin connected with a power pin of the microprocessor to supply power to the microprocessor when the computer is connected to the interface; the unidirectional pin of the interface is connected with the power pin of the microprocessor to supply power to the microprocessor when the portable device is connected to the interface.

5. The keyboard circuit as claimed in claim 4, wherein the power supply pin connects to the power pin through a first diode and a third resistor connected in series.

6. The keyboard circuit as claimed in claim 5, wherein an anode of the first diode is connected to the power supply pin and a cathode of the first diode is connected to the third resistor.

7. The keyboard circuit as claimed in claim 4, wherein the unidirectional pin connects to the power pin through a second diode.

8. The keyboard circuit as claimed in claim 7, wherein an anode of the second diode is connected to the unidirectional pin and a cathode of the second diode is connected to the power pin.

9. The keyboard circuit as claimed in claim 8, wherein the keyboard circuit comprises a capacitor connected to a node between the second diode and the power pin, wherein when the interface is connected with the portable device, the portable device supplies power to the power pin of the microprocessor and charges the capacitor through the unidirectional pin of the interface when no data being transmitted through the second communication circuit, and the capacitor discharges and supplies power to the power pin of the microprocessor when the microprocessor uses the second communication circuit to transmit data to the portable device.

10. The keyboard circuit as claimed in claim 1, wherein the microprocessor is capable of switching the keyboard circuit to sleep mode when there is no keystroke on the keyboard.

11. A control method for a keyboard and a keyboard circuit, wherein the keyboard circuit comprises an interface, a detection circuit, a microprocessor, and a first communication circuit and a second communication circuit connected between the microprocessor and the interface, the method comprising:
    detecting a logic level signal of power supply from a computer or a portable device connected to the interface using the detection circuit;
    determining whether the keyboard is connected with the computer or the portable device in accordance with the detected logic level signal using the microprocessor; and
    enabling the first communication circuit using the microprocessor when the keyboard is connected to the computer, or enabling the second communication circuit using the microprocessor when the keyboard is connected to the portable device.

12. The method claimed in claim 11, further comprising:
    analyzing whether the logic level signal is a high logic level signal or a low logic level signal, wherein the high logic level signal indicates the keyboard is connected with the computer, and the low logic level signal indicates the keyboard is connected with the portable device.

13. The method claimed in claim 11, further comprising:
    supplying power from the computer to the keyboard through a first power supply track;
    supplying power from the portable device to the keyboard through a second power supply track.

14. The method claimed in claim 13, further comprising:
    supplying power from a capacitor to the keyboard when the second communication circuit is in use, wherein the capacitor is charged by the second power supply track when the portable device is connected to the keyboard.

15. The method claimed in claim 11, further comprising:
    switching the keyboard to a sleep mode when there is no keystroke on the keyboard; and
    switching the keyboard to a working mode when there is a keystroke on the keyboard.

16. The method claimed in claim 15, further comprising:
    generating a key code corresponding to the keystroke on the keyboard when the keyboard is in the working mode; and
    transmitting the key code to the computer or the portable device.

* * * * *